(12) United States Patent
Erickson et al.

(10) Patent No.: US 6,212,639 B1
(45) Date of Patent: Apr. 3, 2001

(54) ENCRYPTION OF CONFIGURATION STREAM

(75) Inventors: Charles R. Erickson, Fremont; Danesh Tavana, Mountain View; Victor A. Holen, Los Gatos, all of CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/342,336

(22) Filed: Jun. 29, 1999

Related U.S. Application Data (62) Division of application No. 08/703,117, filed on Aug. 26, 1996.

(51) Int. Cl.$^7$ .................................................. H04K 1/00
(52) U.S. Cl. .................... 713/200; 713/166; 713/187; 713/189; 713/196; 713/193; 380/268; 326/38
(58) Field of Search ................................. 713/200, 166, 713/187, 189, 190, 193; 380/268; 326/38

(56) References Cited

U.S. PATENT DOCUMENTS

| | | | |
|---|---|---|---|
| 5,081,675 | 1/1992 | Kittirutsunetorn | 380/4 |
| 5,349,249 * | 9/1994 | Chiang et al. | 307/465 |
| 5,388,157 * | 2/1995 | Austin | 380/4 |
| 5,406,627 | 4/1995 | Thompson et al. | 380/20 |
| 5,748,734 * | 5/1998 | Mizikovsky | 380/21 |
| 5,768,372 * | 6/1998 | Sung et al. | 380/3 |
| 5,915,017 * | 6/1999 | Sung et al. | 380/3 |

OTHER PUBLICATIONS

"The Programmable Logic Data Book," pp. 2–25 through 2–46, Xilinx, 1994, San Jose, California.
Datasheet for XC5200 FPGA from Xilinx.
Schneier, Applied Cryptography, 2nd edition, pp. 4, 5 and 32–36, Oct. 1995.*

* cited by examiner

Primary Examiner—Tod R. Swann
Assistant Examiner—Paul E. Callahan
(74) Attorney, Agent, or Firm—William L. Paradice, III; Edel M. Young (57) ABSTRACT

A method of communicating encrypted configuration data between a programmable logic device (PLD) and a storage device is included in one part of the invention. The method includes the following steps. Transmit encrypted configuration data stored in a storage device to the PLD. Decrypt the encrypted configuration data to generate a copy of the configuration data in the PLD. Configure the PLD using the copy of the configuration data. In one embodiment, the PLD transmits a key to the storage device. In another embodiment the key is separately entered into the storage device and the PLD and never transmitted between the PLD and the storage device. In another embodiment, the key is entered only into the PLD. The key is used to encrypt the configuration data.

2 Claims, 4 Drawing Sheets

ENCRYPTION OF CONFIGURATION STREAM

RELATED APPLICATIONS

This application is a divisional of U.S. patent application Ser. No. 08/703,117 entitled "Configuration Stream Encryption" filed Aug. 26, 1996, which is incorporated herein by reference.

BACKGROUND OF THE INVENTION

1. Field of the Invention

This invention relates to the field of circuit design. In particular, the invention relates to a method and apparatus for securing data used to configure a programmable logic device.

2. Background Information

Programmable Logic Devices (PLDs) are a class of devices that allow a user to program a device to perform the function of a particular circuit. Examples of PLDs are FPGAs (Field Programmable Gate Arrays) and EPLDs (Erasable Programmable Logic Devices).

To use a PLD, a user captures a circuit design using any of several design capture tools. The user then uses software tools to convert the captured design into a device specific bitwise representation. The bitwise representation is stored in a storage device, such as an EPROM. Upon startup, the storage device supplies the bitwise representation to the PLD, thereby enabling the PLD to perform the function of the circuit design. The PLD, having read in the bitwise representation, then performs the function of the circuit design.

By the time the bitwise representation is created, significant amounts of time and effort have been expended. To encourage individuals and companies to continue to invest in the research and development of new circuit designs, it is desirable to provide some method of protecting the circuit designs from illegal copying and use.

To make an illegal copy of the circuit design, as implemented in the programmable logic device, one need only make a copy of the bitwise representation stored in the storage device. The copied bitwise representation can then be illegally used with other programmable logic devices. Therefore, it is desirable to make it more difficult to copy the bitwise representation of the circuit design.

Additionally, some types of PLDs support multiple configuration modes. For example, the XC4000™ series FPGAs, available from Xilinx, Inc. of San Jose, Calif., supports multiple configuration modes. The 1994 Xilinx Data Book, page 2–25 through page 2–46, describes the unsecured configuration modes for the XC4000™ FPGA product family. Therefore, it is desirable to have secure configuration of PLDs that have multiple configuration modes. Of course no system can be absolutely secure from all potential unauthorized access, therefore, the term "secure" is used to mean more secure than systems without any security.

Some PLDs can be chained together for the purpose of configuration. After one PLD is configured, the configuration data is passed to the next PLD in the chain. Therefore, it is desirable to support the secured configuration of multiple chained PLDs.

SUMMARY OF THE INVENTION

A method and apparatus for encrypting the information used in configuring a programmable logic device is described.

A method of communicating encrypted configuration data between a programmable logic device (PLD) and a storage device is included in one part of the invention. The method includes the following steps. Transmit encrypted configuration data stored in a storage device to the PLD. Decrypt the encrypted configuration data to generate a copy of the configuration data in the PLD. Configure the PLD using the copy of the configuration data. In one embodiment, the PLD transmits a key to the storage device. In another embodiment, the manufacturer, user, or someone else, stores a key in the storage device and in the PLD. In both embodiments, the key is used to encrypt the configuration data.

In one embodiment, the storage device includes an encryption circuit. The encryption circuit generates a bit of the encrypted configuration data, D*, from a bit of the configuration data, D, using the relationship: $D \oplus X = D^*$, where $\oplus$ indicates an exclusive OR logical operation. X is a signal generated from previous bits of the encrypted configuration data. The PLD includes a decryption circuit. The decryption circuit generates a copy of the bit of the configuration data, D, from a bit of the encrypted configuration data, D*, using the relationship: $D^* \oplus X = D$.

In one embodiment, the storage device includes no encryption circuit. The PLD and storage device are used in pairs. A software system (work station) or user generates or supplies a key and sends the key or a related key to the PLD. It generates encrypted configuration data using the key and sends the encrypted configuration data to the storage device. The PLD includes a decryption circuit. The key in the PLD is used by this decryption circuit to decrypt the encrypted configuration data received from the storage device.

In one embodiment, multiple PLDs are chained together during the configuration mode. The storage device transmits the encrypted configuration data to the first PLD in the chain, then to the next PLD.

In one embodiment, each PLD listens to all of the encrypted configuration data until the storage device begins transmitting the encrypted configuration data for that PLD. In another embodiment, the first PLD decrypts the configuration data for itself. When fully programmed, the first PLD passes the encrypted configuration data onto the next PLD in the chain. In this embodiment, the programmed PLD also transfers the current state of its decryption circuit to the next PLD in the chain.

Although many details have been included in the description and the figures, the invention is defined by the scope of the claims. Only limitations found in those claims apply to the invention.

BRIEF DESCRIPTION OF THE DRAWINGS

The figures illustrate the invention by way of example, and not limitation. Like references indicate similar elements.

DETAILED DESCRIPTION OF THE DRAWINGS

Secure Programmable Logic Device System

Figure 1:
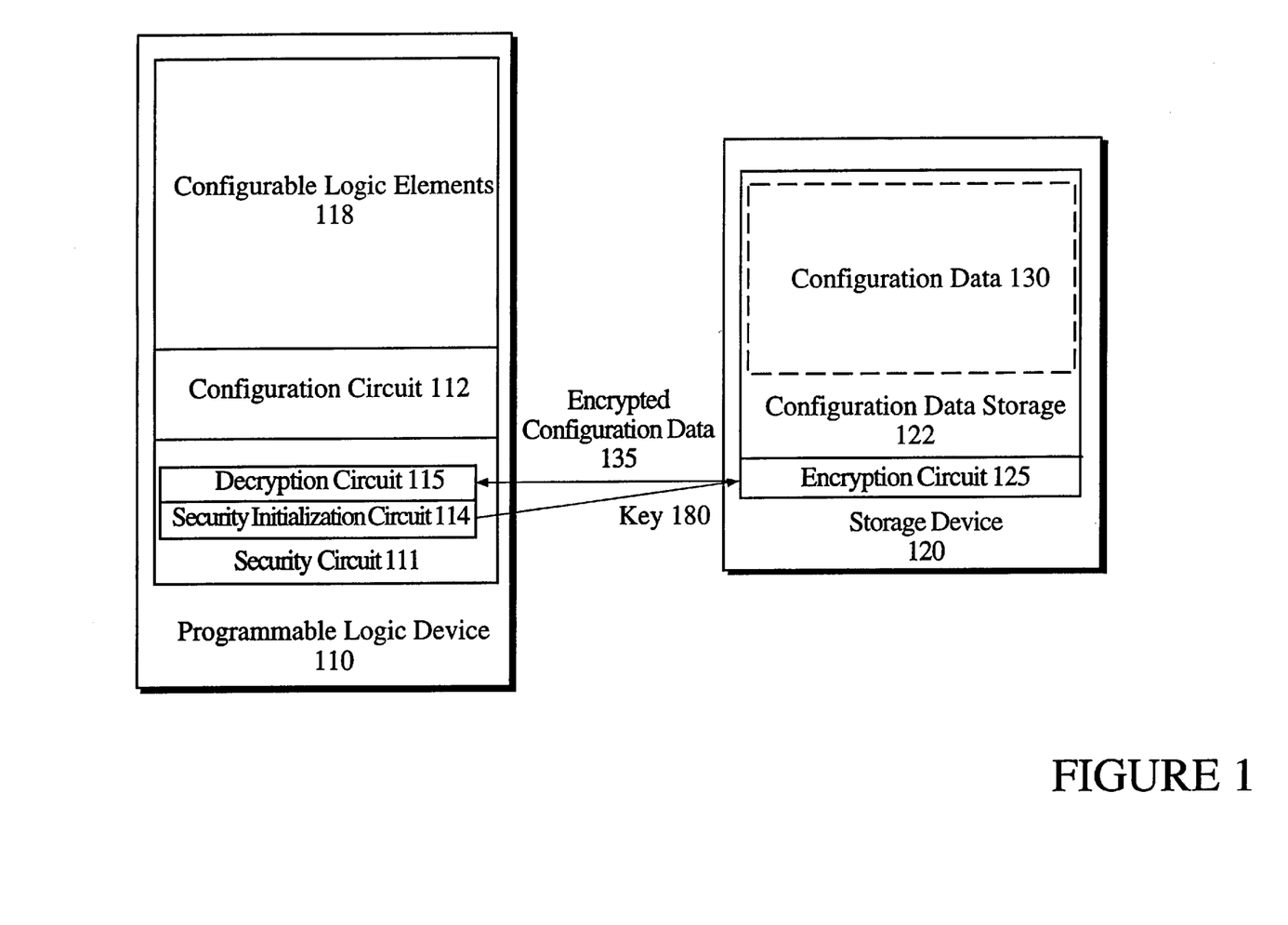
FIG. 1 illustrates a programmable logic device and storage device having security circuits.

FIG. 1 illustrates a programmable logic device (PLD) and storage device having security circuits. In one embodiment of the invention, the PLD provides the storage device with a key. The storage device then encrypts the bitwise configuration data before transmitting the configuration data to the PLD. The PLD then decrypts the configuration data prior to using the configuration data.

The following paragraph identifies the elements of FIG. 1 and how the elements are connected. FIG. 1 includes a PLD 110 and a storage device 120. The PLD 110 includes the following elements: a security circuit 111; a configuration circuit 112; and a number of configurable logic elements 118. The security circuit 111 includes a security initialization circuit 114 and a decryption circuit 115. The storage device 120 includes an encryption circuit 125. The security circuit 111 connects to the input of the encryption circuit 125. The encryption circuit 125 connects to the decryption circuit 115. The storage device 120 also includes a configuration data storage unit 122. The configuration data storage unit 122 stores the configuration data 130. The configuration data 130 includes the bitwise representation of the circuit design, as that circuit design is to be implemented by the PLD 110. The configuration data 130 is what is protected by one embodiment of the invention.

In one embodiment of the invention, the configurable logic elements 118 are programmed as follows. First, the PLD 110 waits until the power supply becomes stable at a predetermined voltage (e.g., at 3.5 volts). Next, a power-on reset step resets some devices in the PLD 110. Next, the configurable logic elements 118 are reset. Then, the security initialization circuit 114 generates a pseudo-random digital key 180. In one embodiment, the key 180 is a string of 0's and 1's eight bits long, not all 1's or all 0's. The key 180 is communicated to the encryption circuit 125. The encryption circuit 125 then uses the key 180 to generate the encrypted configuration data 135 from the configuration data 130. The storage device 120 transmits the encrypted configuration data 135 to the decryption circuit 115. The decryption circuit 115 uses the key 180 from the security initialization circuit 114 to decrypt the encrypted configuration data 135 to generate the configuration data 130. The configuration data 130 is then fed to the configuration circuit 112. The configuration circuit 112 uses the configuration data 130 to program the configurable logic elements 118. Importantly, because the PLD 110 generates the pseudo-random key 180 each time it is programmed, and the key 180 is used to encrypt the configuration data 130, it is ineffective for a person to copy the encrypted configuration data 135 because the encrypted configuration data 135 will be different each time the PLD is configured. To copy the configuration data 130, a person must copy the encrypted configuration data 135, must know the key 180, and must know the technique used to encrypt the encrypted configuration data 135.

The following paragraphs describe the elements of FIG. 1 in greater detail.

The configurable logic elements 118 perform the functions of the circuit design. In one embodiment of the invention, the configurable logic elements 118 include configurable logic blocks and configurable input/output blocks similar to those in the XC4000™ series FPGAs. The configuration data 130, in one embodiment, includes a bitwise representation of the circuit design as implemented in a specific XC4000 series FPGA. In one embodiment, the XACT Step™ software tools generate the bitwise representation. Other embodiments of the invention include other PLDs (e.g., XC5200™ FPGA, also available from Xilinx, Inc., FLEX8000™ available from Altera, Inc., of San Jose, Calif.) and use other tools to generate the configuration data 130 (e.g., Max+Plus II™).

The configuration circuit 112 controls the storage of the configurable logic elements 118 and the operation of the security circuit 111. The configuration circuit 112 also enables the storage of daisy chained PLDs 110. The decryption circuit 115 decrypts the encrypted configuration data 135 using the key 180 and the initialization data 202 and supplies the decrypted configuration data 130 to the configuration circuit 112. Analogously, the encryption circuit 125 encrypts data received from the configuration data storage unit 122 to generate the encrypted configuration data 135. The decryption circuit 115 and the encryption circuit 125 are described in greater detail below.

The security circuit 111 generates keys 180 for use in the encryption process. The use of the keys 180 provide improved security over one embodiment of the invention. In this alternate embodiment of the invention, the configuration data 130 is encrypted by the software used to generate the configuration data 130, e.g., the configuration data 130 is encrypted by an extension to the XACT Step tools. The encrypted configuration data 135 is then stored in the storage device 120. In this embodiment, the storage device does not include the encryption circuit 125, and the security circuit 111 does not generate keys 180 for the storage device 120. In this embodiment, the PLD 110 simply decrypts the encrypted configuration data 135 generated by the software tools. However, to copy the circuit design as implemented in the PLD 110, one need only copy the encrypted configuration data 135 and store this data in a storage device 120. Thus, in one embodiment, at least one pseudo-random key 180 is generated in the PLD 110. The key 180 is then used by the storage device 120 to encrypt the configuration data 130; thus, making copying of the configuration data 130 more difficult. In another embodiment, at least a portion of the configuration data 130 is encrypted by the software tools before being stored in the storage device 120 and the encryption circuit 125 further encrypts the already encrypted data. The security circuit 111 performs a complementary double decryption to generate the configuration data needed to program the configurable logic elements 118.

The storage device 120 is loaded with the configuration data 130. In one embodiment, the storage device 120 includes an EPROM with the additional encryption circuit 125. Importantly, in one embodiment, the encryption techniques used in the encryption circuit 125 are difficult to determine. To determine what techniques are being used, one would need to reverse engineer the storage device 120; a time consuming and difficult task. Other embodiments of the invention include other storage devices such as an EEPROM or a ROM. In one embodiment of the invention, the storage device 120 is replaced by a microprocessor that accesses the configuration data from a storage device (e.g., RAM, ROM) and encrypts the configuration data.

In another embodiment of the invention, the PLD 110 does not include the security circuit 114. In this embodiment, the PLD 110 and the storage device 120 include storage areas for the key 180. The manufacturer of the PLD 110 and/or the storage device 120, the purchaser of the PLD 110 and/or the storage device 120, or some other person, stores the same key 180 in the PLD 110 and the storage device 120. In different embodiments, the storage areas include EEPROM memory, mask programmed circuits, anti-fuse circuits, and/or other storage devices for storing the key 180. Importantly, during configuration, the key 180 is not communicated between the encryption circuit 125 and the decryption circuit 115. Because the key 180 is never communicated between these two circuits, it is difficult for someone to determine what the key 180 is and therefore what configuration data is present. In an alternate embodiment of this invention, the security circuit 114 only generates the initialization data 202 (described below). The security circuit 114 transmits the initialization data 202 to the encryption circuit 125 and the decryption circuit 115 instead of the key 180.

In one embodiment, the security initialization circuit 114 generates multiple keys during the programming of the configurable logic elements 118. At intervals, the security initialization circuit 114 generates a new key 180. The new key 180 is then transmitted to the storage device 120. The new key 180 is then used to encrypt any configuration data 130 transmitted by the encryption circuit 125 until another new key 180 is received or until all of the stored configuration data 130 has been transmitted to the PLD 110 as the encrypted configuration data 135. In another embodiment, where the security circuit 114 does not transmit a key 180 to the storage device 120, the security circuit 114 periodically generates new initialization data for the encryption circuit and the decryption circuit. The new initialization data is then used to encrypt and decrypt the configuration data. In one embodiment, the security circuit 111 and the encryption circuit 125 implement a public key cryptography system. In one embodiment, security circuit 111 transmits a PLD public key to the encryption circuit 125. The encryption circuit 125 then uses the PLD public key to encrypt the configuration data 130. The security circuit 111 then uses the PLD private key to decrypt the encrypted configuration data 135. One embodiment of the invention uses the RSA public key cryptography system. Other embodiments of the invention use other public key cryptography systems. In another embodiment, the encryption circuit 125 and the security circuit 111 first secure the communications channel between the two devices using the public key cryptography system and then the storage device 120 uses a symmetric key cryptography system (e.g., DES, available from IBM, Inc.) to transmit the configuration data 130.

Public key cryptography systems can require a significant amount of circuitry to implement. One embodiment of the invention reduces the amount of circuitry needed in the PLD 110 by programming the PLD 110 to first operate as a public key cryptography circuit to secure the communications link that allows for the use of symmetric key cryptography. The PLD 110 is then reprogrammed using the secure communications link. In this embodiment, the storage device 120 includes two sets of configuration data. The first set of configuration data is not encrypted by the encryption circuit 125. The first set of configuration data programs the configurable logic elements 118 to operate as a public key cryptography circuit to establish a secure communications link between the PLD 110 and the encryption circuit 125. The programmed PLD 110 exchanges a secret key with the storage device 120. The PLD 110 is then reprogrammed with an encrypted version of the second set of configuration data; the encrypted version of the second set of configuration data being generated from the secret key.

Another embodiment of the invention uses a simpler cryptographic system that requires fewer gates to implement and provides adequate security. This embodiment is described in greater detail below.

An Encryption Circuit

Figure 2:
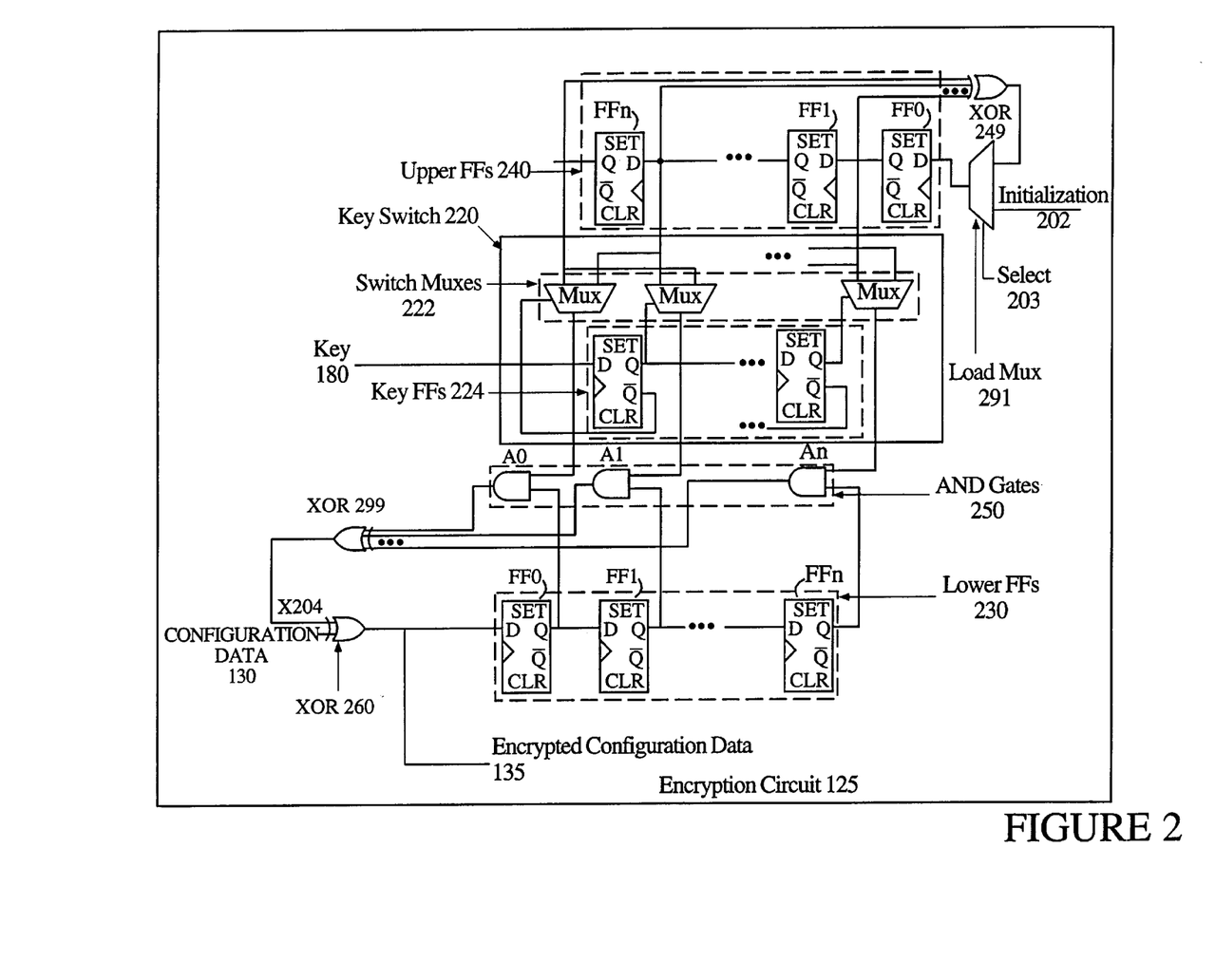
FIG. 2 illustrates an encryption circuit used in a storage device.

FIG. 2 illustrates an encryption circuit used in one embodiment of the invention. The encryption circuit 125 of FIG. 2 uses a relatively small number of gates and provides adequate protection. In the embodiment of FIG. 2, the relationship between a bit of the configuration data 130, D, and a bit of the encrypted configuration data 135. D*, is:

$$D \oplus X = D^* \qquad (EQ.\ 1)$$

where $\oplus$ indicates an exclusive OR operation, X is a signal generated from one or more previous bits of the encrypted configuration data 135, D*old, and the key 180. Therefore, to decrypt D*, one need only perform the following operation:

$$D^* \oplus X = D, \qquad (EQ.\ 2)$$

where X remains the same as in equation one.

The following paragraphs describe the elements in FIG. 2 and how they are connected. FIG. 2 includes an encryption circuit 125 having: upper flip-flops 240, a key switch 220, AND gates 250, lower flip-flops 230, XOR gate 260, XOR gate 299, XOR gate 249, and a load multiplexer 291. The configuration data 130 and the XOR'd outputs of the AND gates 250 (signal X204 from XOR gate 299) are connected to an input of the XOR gate 260. The output of the XOR 260 is the encrypted configuration data 135. The encrypted configuration data 135 is fed to the input of the lower flip-flops 230.

The lower flip-flops 230 include a number of D flip-flops. The first flip-flop has an input connected to receive the encrypted configuration data 135. The output of the first flip-flop is connected to the input of the second flip-flop. The second flip-flop's output is connected to third flip-flop, etc. Thus, the lower flip-flops 230 form a shift register. In one embodiment, the lower flip-flops 230 include eight D flip-flops. Other embodiments of the invention implement the shift register using different devices (e.g., T flip-flops). Each output of the lower flip-flops 230 is also connected to an input of a different AND gate of the AND gates 250.

The upper flip-flops 240 form a second shift register, similar to the shift register formed by the lower flip-flops 230. The outputs of some of the upper flip-flops 240 are fed back, through the XOR gate 249, into the an input of the load mux 291. The other input of the load mux 291 is connected to an initialization signal 202. A select signal 203 connects to the load mux 291 select input. A select signal 203 determines whether the load mux 291 causes a loading of the upper flip-flops 240, or a feeding back of the XOR'd outputs of the upper flip-flops 240. How many, and which outputs used as inputs in the XOR gate 249 help scramble the values generated by the upper flip-flops 240.

The key switch 220 also receives the output of the upper flip-flops 240 and provides additional inputs to the AND gates 250. The output of each upper flip-flop 240 is connected to two different switch muxes 222. The select lines of the switch muxes 222 are connected to an output of the key flip-flops 224. The key flip-flops 224 form a shift register for storing the key 180. Each output of each of the key flip-flops 224 is connected to the select inputs of two different switch muxes 222. Each output of each switch mux 222 is connected to an input of an AND gate 250. The patterns of the connections between the upper flip-flops 240, the key flip-flops 224, and the switch muxes 222 help encrypt the configuration data 130. The outputs of the AND gates 250 are XOR'd together (using XOR gate 299) to generate the signal X204. X204 is then XOR'd with the configuration data 130.

The following paragraphs describe the operation of the encryption circuit 125. Importantly, the encryption circuit 125 supports both an initialization procedure and an encryption procedure.

The initialization procedure prepares the encryption circuit 125 for encrypting the configuration data 130. That is, prior to beginning to encrypt the configuration data 130, the encryption circuit 125 is first initialized. In one embodiment of the invention, the upper flip-flops 240 are loaded with the initialization data 202 by asserting the select signal 203. The initialization data 202 defines the starting state of the upper flip-flops 240. Also as part of the initialization procedure, the key 180 is received and shifted into the key flip-flops 224. In one embodiment of the invention, the upper flip-flops 240 are set during the initialization procedure. The lower flip-flops 230 are reset during the initialization. In another embodiment, the lower flip-flops 230 and the upper flip-flops 240 are set to a predefined pattern of 1's and 0's.

After the initialization procedure, the encryption procedure then begins generating the encrypted configuration data 135. The key switch 220 output and the portion of the encrypted configuration data 135 stored in the lower flip-flops 230 are AND'ed in the AND gates 250. The output of the AND gates 250 is then XOR'd to generate a signal X204. Each new configuration data 130 bit is XOR'd with the signal X204 to generate a corresponding new encrypted configuration data 135 bit. The new encrypted configuration data 135 bit is shifted into the first flip-flop in the lower flip-flops 230.

The upper flip-flops 240 shift bits from the first flip-flop to the last flip-flop. The outputs of the upper flip-flops 240 determine the value fed back into the first flip-flop. The outputs are also used as the inputs to the switch muxes 222. Each switch mux 222 has two inputs from two different flip-flops in the upper flip-flops 240. Each switch mux 222 has a select line connected to one of the key flip-flops 224. Thus, the 1's and 0's in the key flip-flops 240 determine how the outputs of the upper flip-flops 240 are connected to the AND gates 250. A change in the key 180 value effectively changes the connections to the AND gates 250.

Table 1 illustrates an example set of encrypted configuration data 135 generated from the configuration data 130. In this example, there are three upper flip-flops 240, three lower flip-flops 230. The key is one bit long and connects the outputs of the middle flip-flops in the upper and lower flip-flops to the middle AND gate, connects the outputs of the last flip-flop in the upper flip-flops 240 to the same AND gate as the first flip-flop in the lower flip-flops 230, and vice-versa. Also, only the outputs of the last two upper flip-flops 240 are used as feedback to the first flip-flop. D is a bit in the configuration data 130. D* is the corresponding bit in the encrypted configuration data 135.

TABLE 1

| Upper Flip-Flops 240 | | | Lower Flip-Flops 230 | | | AND Gates 250 | | | | | |
|---|---|---|---|---|---|---|---|---|---|---|---|
| FF2 | FF1 | FF0 | FF2 | FF1 | FF0 | A2 | A1 | A0 | X | D | D* |
| 1 | 1 | 1 | 0 | 0 | 0 | 0 | 0 | 0 | 0 | 1 | 1 |
| 1 | 1 | 0 | 0 | 0 | 1 | 0 | 0 | 1 | 1 | 0 | 1 |
| 1 | 0 | 0 | 0 | 1 | 1 | 0 | 0 | 1 | 1 | 1 | 0 |
| 0 | 0 | 1 | 1 | 1 | 0 | 1 | 0 | 0 | 1 | 1 | 0 |
| 0 | 1 | 0 | 1 | 0 | 0 | 0 | 0 | 0 | 0 | 0 | 0 |
| 1 | 0 | 1 | 0 | 0 | 1 | 0 | 0 | 1 | 1 | 0 | 1 |
| 0 | 1 | 1 | 0 | 1 | 1 | 0 | 1 | 0 | 1 | 0 | 1 |
| 1 | 1 | 1 | 1 | 1 | 1 | 1 | 1 | 1 | 0 | 0 | 0 |

In one embodiment of the invention, the encryption circuit 125 does not include the upper flip-flops 240. In this embodiment, the key switch 220 is connected to the outputs of the lower flip-flops 230. Similar changes are made to the decryption circuit 115.

In another embodiment of the invention, the initialization data 202 is received at the input to a load mux 290. The other input to the load mux 290 is the encrypted configuration data 135 (the encrypted configuration data 135 is no longer connected directly to the first flip-flop in the lower flip-flops 230). The output of the load mux 290 is connected to the input of the first flip-flop in the lower flip-flops 230. The select signal 203 selects between the encrypted configuration data 135 or the initialization data 202. The initialization signal 202 is no longer connected to the load mux 291. The output of the last flip-flop in the lower flip-flops 230 is connected to the load mux 291 instead. Thus, the lower flip-flops 230 and the upper flip-flops 240 act as one long shift register when the select 203 signal is appropriately asserted. Thus, in this embodiment, the upper and lower flip-flops are loaded together during the initialization process.

In an embodiment of the invention where the security initialization circuit 114 does not transmit the key 180 to the storage device 120, the encryption circuit 125 operates as follows. The key switch 220 receives the key 180 from the storage area. In one embodiment, the key flip-flops 224 are replaced with the storage area devices. In any case, the key switch 220 includes the key 180. The select signal 203 is asserted to cause the upper and lower flip-flops to act as one long shift register. This long shift register is then loaded with the initialization 202 data. In one embodiment, the initialization data 202 is received from the PLD 110 (FIG. 1).

Decryption Circuit

Figure 3:
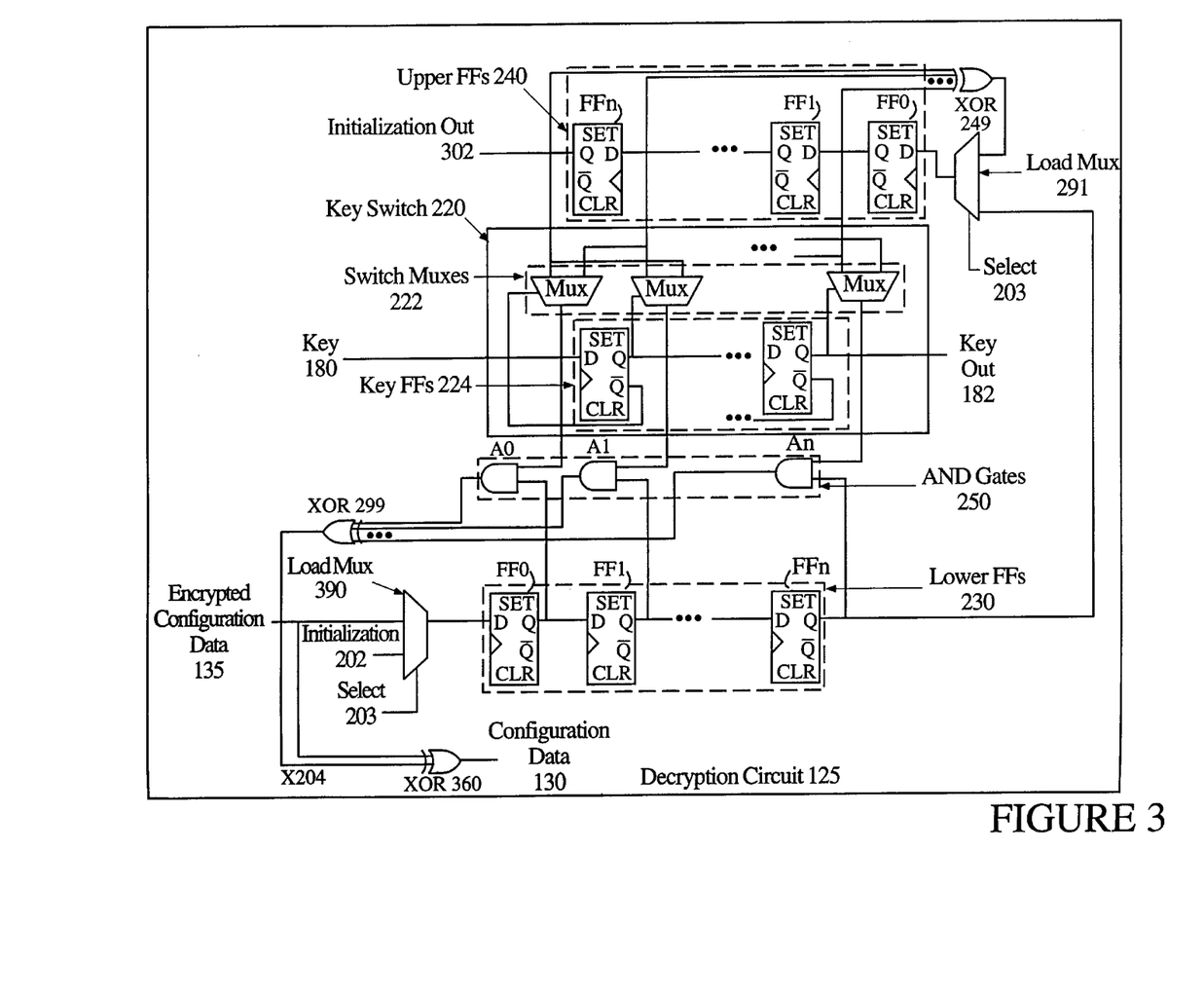
FIG. 3 illustrates a decryption circuit used in a programmable logic device.

FIG. 3 illustrates a decryption circuit used in a programmable logic device. The decryption circuit 115 of FIG. 3 uses a relatively small number of gates and provides adequate protection of the circuit design as implemented in the PLD.

The decryption circuit 115 is very similar to the encryption circuit 125. The similarity helps reduce the cost of designing the encryption and decryption circuits. (Note that the decryption circuit 115 is similar to the alternate embodiment having the load mux 290.) The following describes the differences between the two circuits. The element in the decryption circuit 115 not included in the encryption circuit 125 is the load multiplexer 390. The initialization signal 202 input of the load mux 291 has been changed to be the output of the last flip-flop in the lower flip-flops 230. The load mux 390 has one input connected to the encrypted configuration data 135 and the other input connected to the initialization data 202. Additionally, the XOR 260 is relabeled as XOR 360 to reflect that the operation being performed by the XOR 360 is different from the XOR 260 (i.e. D*⊕X=D instead of D⊕X=D*).

The pattern of the connections that connect the inputs of the switch muxes 222 to the outputs of the upper flip-flops 240 are the same as in the encryption circuit 125. Similarly, the connections to the XOR 249 from the upper flip-flops 240 must also be the same as in the encryption circuit 125. If these two conditions are not true, then the value of X204 may be different in the encryption circuit 125 than in the decryption circuit 115, resulting in a failure of the encryption and decryption scheme.

Importantly, as will be shown below, the addition of the load mux 390 and the change to one of the inputs of the load mux 291, allow the lower flip-flops 230 and the upper flip-flops 240 to act as one long shift register. By asserting the select signal 203, the output of the last flip-flop in the lower flip-flops 230 is fed to the input of the first flip-flop of the upper flip-flops 240. Thus, the initialization signal 202 can load all the bits in the both the upper and the lower flip-flops.

The following describes the operation of the decryption circuit 115. The decryption circuit 115 supports an initialization procedure and a decryption procedure. The initialization procedure causes the upper flip-flops 240 and the lower flip-flops 230 to be loaded with the values of the initialization signal 202. In another embodiment, the initialization procedure simply resets the lower flip-flops 230 and sets the upper flip-flops 240. In another embodiment, the lower flip-flops 230 and the upper flip-flops 240 are set to predetermined pattern of 1's and 0's. The key 180 is also loaded into the key flip-flops 224. Importantly, the initial states of the key switch 220, the upper flip-flops 240 and lower flip-flops 230 in the encryption circuit 125 must be the same as the initial states of the key switch 220, the upper-flip-flops 240 and the lower flip-flops 230 in the decryption circuit 115. Otherwise, the decryption circuit 115 will not be able to decrypt the encrypted configuration data 135. During the decryption procedure, the encrypted configuration data 135 is received by the decryption circuit 115 and is XOR'd with the signal X204. The result of XOR'ing X204 and the encrypted configuration data 135 is the configuration data 130. The encrypted configuration data 135 is shifted through the lower flip-flops 230 to regenerate the same X204 as was generated in the encryption circuit 125.

Table 2 provides an example of decrypting the encrypted configuration data 135. The same set of conditions used to generate Table 1 are used to generate Table 2. Importantly, the configuration data D of Table 2 is the same as the configuration data D of Table 1.

TABLE 2

| Upper Flip-Flops 240 | | | Lower Flip-Flops 230 | | | AND Gates 250 | | | | |
|---|---|---|---|---|---|---|---|---|---|---|
| FF2 | FF1 | FF0 | FF2 | FF1 | FF0 | A2 | A1 | A0 | X | D* | D |
| 1 | 1 | 1 | 0 | 0 | 0 | 0 | 0 | 0 | 0 | 1 | 1 |
| 1 | 1 | 0 | 0 | 0 | 1 | 0 | 0 | 1 | 1 | 1 | 0 |
| 1 | 0 | 0 | 0 | 1 | 1 | 0 | 0 | 1 | 1 | 0 | 1 |
| 0 | 0 | 1 | 1 | 1 | 0 | 1 | 0 | 0 | 1 | 0 | 1 |
| 0 | 1 | 0 | 1 | 0 | 0 | 0 | 0 | 0 | 0 | 1 | 1 |
| 1 | 0 | 1 | 0 | 0 | 1 | 0 | 0 | 1 | 1 | 1 | 0 |
| 0 | 1 | 1 | 0 | 1 | 1 | 0 | 1 | 0 | 1 | 1 | 0 |
| 1 | 1 | 1 | 1 | 1 | 1 | 1 | 1 | 1 | 0 | 0 | 0 |

Daisy-Chained Programmable Logic Devices with Secure Configuration

Figure 4:
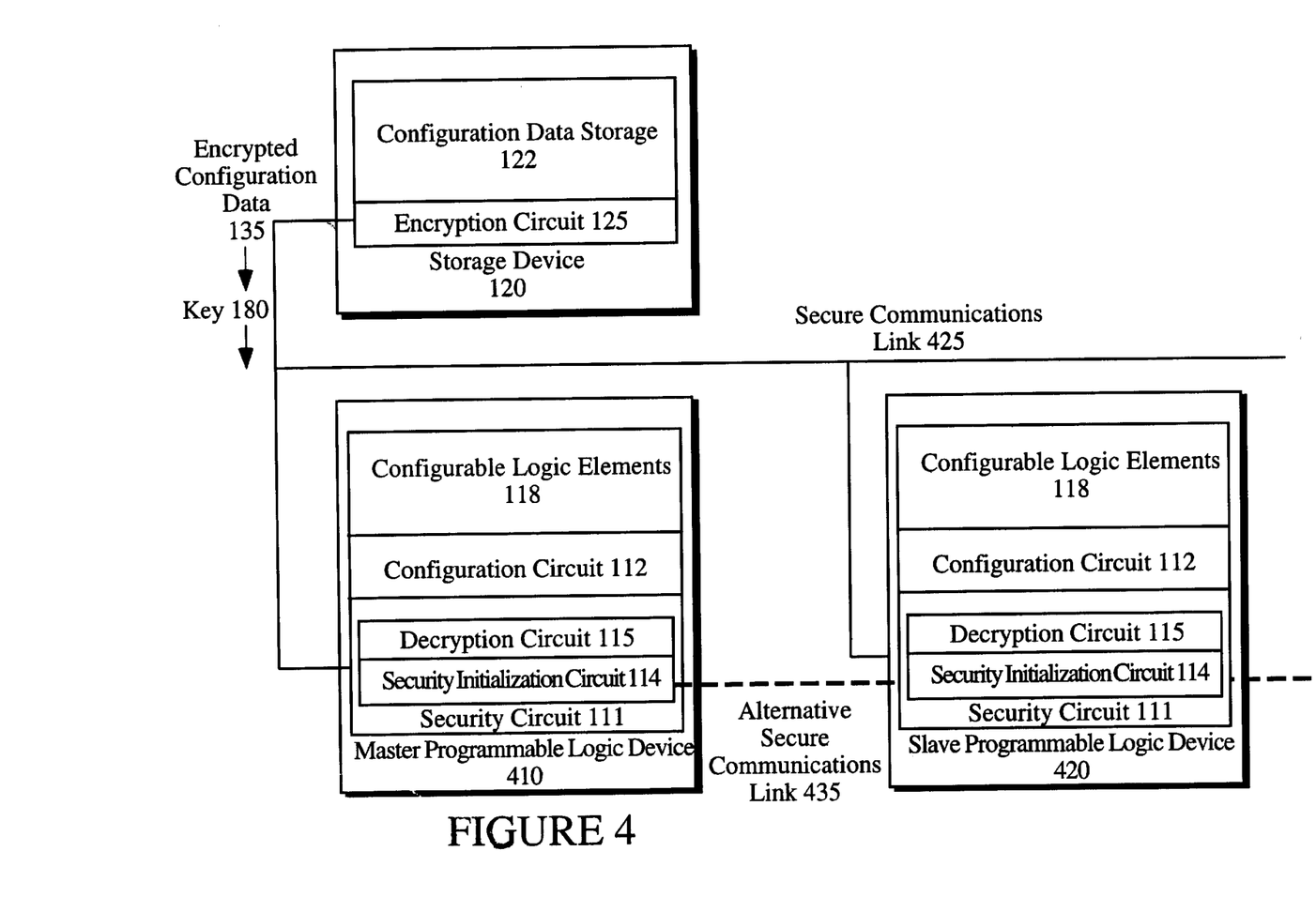
FIG. 4 illustrates a number of daisy-chained programmable logic devices having security circuits.

FIG. 4 illustrates a number of daisy-chained programmable logic devices having security circuits. In one embodiment, the PLDs 110 support various configuration modes. Some of the configuration modes allow PLDs to be linked (daisy-chained) during the configuration process. One embodiment of the invention supports secure communications of the configuration data for daisy-chained PLDs.

The elements of FIG. 4 are the storage device 120, a master PLD 410 and a slave PLD 420. In one embodiment, the storage device 120, the master PLD 410 and the slave PLD 420 communicate the key 180 and the encrypted configuration data 135 over the secure communications link 425. (The secure communications link 425 includes a bus for communicating the key 180 and the encrypted configuration data 135.) In this embodiment, each PLD is directly connected to the secure communications link 425 (e.g., master PLD 410 and slave PLD 420 are both connected to the secure communications link 425). In another embodiment, the PLDs 110 are daisy-chained using the alternative secure communications link 435. For example, the output from the encryption circuit 125 is fed to the input of the security circuit 111 of the master PLD 410. After being programmed, the master PLD 410 feeds the remaining encrypted configuration data 135, and the key 180, to the next PLD in the daisy-chain (e.g., slave PLD 420), using the alternative secure communications link 435.

Prior to describing the use of the two secure communications links, some of configuration modes supported by the PLD are described. One embodiment supports a multiple PLD configuration mode where multiple PLDs 110 are all connected to the storage device 120 and are programmed one after the other. One embodiment supports secure storage of the PLD during configuration modes similar to the following configuration modes of the Xilinx, Inc. XC4000™ FPGA product family: a slave serial mode, a master serial mode, a master parallel up mode, and a master parallel down mode. The 1994 Xilinx Data Book, page 2–25 through page 2–46, describes the unsecured configuration modes for the XC4000™ FPGA product family. Another embodiment supports other secure configuration modes, such as, a secure version of the express mode (described in the XC5200™ FPGA data sheet from Xilinx, Inc.). The following briefly describes each of these modes and the various uses of the two secure communications links.

The multiple PLD configuration mode allows multiple PLDs 110 to be programmed from one storage device 120 using the secure communications link 425. Each PLD listens to the secure communications link 425 to receive the encrypted configuration data 135 and the key 180 (and any additional keys 180 if the storage device 120 changes the keys during the configuration process). During the initialization procedure, each PLD performs the initialization procedure described above. During the configuration procedure, each PLD decrypts the encrypted configuration data 135 to generate the configuration data 130. However, only one PLD at a time uses the configuration data 130 to program that PLD's 110 configurable logic elements 118. For example, the master PLD 410 will program its configurable logic elements 118, using the generated configuration data 130, until the configurable logic elements 118 are completely programmed. Then the next PLD in the daisy-chain (slave PLD 420) will use the generated configuration data 130 to program the configurable logic elements 118 of that next PLD. In one embodiment, when completely programmed, a PLD notifies the next PLD 110 in the chain to begin using the configuration data 130. In another embodiment, the storage device 120 notifies each PLD when that PLD should begin programming itself with the configuration data 130.

The slave serial mode is used for PLDs 110 that depend on other PLDs 110 for their configuration data 130. For slave serial mode, the slave PLD 420 accepts the encrypted configuration data 135 from a single bit wide data bus, in the secured communications link 425, and retransmits the encrypted configuration data 135 to the next slave PLD when that slave PLD 420 is completely programmed. Prior to decrypting the encrypted configuration data 135, the slave PLD 420 loads the initialization data 202 into the upper flip-flops 240 and the lower flip-flops 230 of the slave PLD 420's decryption circuit 115. Similarly, the slave PLD 420 loads the key 180 into the key flip-flops 224 of the slave PLD 420's decryption circuit 115.

The master serial mode is used for the master PLD 410 in a chain of PLDs 110. The chain of PLDs 110 are configured one after another. Additionally, the master serial mode is used where only one PLD is configured. The master serial mode is similar to the slave serial mode except that in the master serial mode, the master PLD 410 drives a configuration clock signal to the slave PLDs 420 and to the storage device 120. Once fully programmed, the security circuit 111 causes the encrypted configuration data 135 to bypass the decryption circuit 114 of the master PLD 410 and to be retransmitted to the slave PLD 420 via the alternative secure communications link 435. Prior to beginning to retransmit the encrypted configuration data 135, the master PLD 410 unloads the data in the upper and the lower flip-flops via the initialization out signal 302 (FIG. 3). The initialization out signal 302 is connected to the initialization signal 202 of the decryption circuit 115 of the slave PLD 420. Similarly, the master PLD 410 unloads the key 180 in the key flip-flops 224 via the key out 182 signal (FIG. 3). The key out 182 signal is connected to the input of the first key flip-flop 224 of the decryption circuit 115 of the slave PLD 420. In the embodiment where the key 180 is not communicated between the storage device 120 and the PLD (e.g., the key 180 is stored in a non-volatile memory in the PLD and a non-volatile memory in the storage device 120 prior to being shipped to a customer), no key out 182 signal is generated. In this embodiment, the initialization out signal 302 only includes the current state of the upper flip-flops 240 and the lower flip-flops 230.

The master parallel up mode is used where the storage device 120 includes a multiple bit wide output (e.g., byte-wide output). In one embodiment having parallel configuration data bits, the parallel configuration data is XOR'd with X204 or is XOR'd with taps from the lower flip-flops 230. The encryption circuit 125 and the decryption circuit 115 thus support encrypted configuration data output and inputs that are multiple bits wide. The master parallel up mode is otherwise similar to the master serial mode.

The master parallel down mode is similar to the master parallel up mode except that the master PLD 410 generates addresses for the storage device 120 starting from the maximum address (e.g., 0xFFFFF) and counts down, instead of starting at the lowest address (e.g., 0x00000) and counting up.

The express mode is used when fast configuration of multiple PLDs 110 is desired. The express mode is a parallel configuration mode for all the PLDs 110 in a chain of PLDs 110. The encrypted configuration data 135 is clocked in from the storage device 120 synchronously. A signal from the first PLD in the chain is used by that PLD to tell the next PLD to begin reading the data inputs for its encrypted configuration data 135.

Other embodiments of the invention support other secure configuration modes such as synchronous peripheral mode and asynchronous peripheral mode.

The above describes a method and apparatus for securing a circuit design as implemented in a programmable logic device. A secure communications link between a storage device and one or more PLDs is first established transmitting encrypted configuration data to the PLD from the storage device.

What is claimed is:

1. A method of communicating encrypted configuration data between a programmable logic device (PLD) and a storage device, the method comprising:

storing first and second unencrypted configuration data for the PLD in the storage device, the first configuration data for implementing a public key cryptography circuit, the second configuration data for implementing a desired circuit design;

transmitting the unencrypted first configuration data to the PLD, configuring the PLD using the unencrypted first configuration data to implement the public key cryptography circuit;

establishing a secure communications link between the storage device and the PLD using the public key cryptography circuit, whereby the storage device and the PLD exchange a secret key;

encrypting the second configuration data using the secret key;

transmitting the encrypted configuration data from the storage device to the PLD; and decrypting the encrypted configuration data using the secret key to generate the second configuration data.

2. The method of claim 1, further comprising:

re-configuring the PLD using the second configuration data.

* * * * *

UNITED STATES PATENT AND TRADEMARK OFFICE
CERTIFICATE OF CORRECTION

PATENT NO. : 6,212,639 B1
DATED : April 3, 2001
INVENTOR(S) : Charles R. Erickson It is certified that error appears in the above-identified patent and that said Letters Patent is hereby corrected as shown below:

<u>Title page,</u>
Item [75], Inventors, delete the following individuals as inventors: "Danesh Tavana, Mountain View California and Victor A. Holen, Los Gatos California"

Signed and Sealed this

Twenty-second Day of October, 2002

Attest:

Attesting Officer

JAMES E. ROGAN
*Director of the United States Patent and Trademark Office*